United States Patent Office 3,529,713
Patented Sept. 22, 1970

3,529,713
METHOD AND DEVICE FOR CONVEYING ROD-SHAPED OBJECTS, AND ESPECIALLY CIGARETTES, BETWEEN TWO LEVELS
Raymond Poupin, Fleury-les-Aubrais, France, assignor to Service d'Exploitation Industrielle des Tabacs et des Allumettes, Paris, France, a French public establishment
Filed Oct. 3, 1967, Ser. No. 672,642
Claims priority, application France, Oct. 5, 1966, 78,792
Int. Cl. B65g 15/14
U.S. Cl. 198—165     19 Claims

ABSTRACT OF THE DISCLOSURE

Device for conveying between two levels objects and especially rod-shaped objects such as cigarettes, of the type comprising at least two endless conveyors such as belts between which a mass of the said objects is introduced, said belts forming therebetween at least part of a passageway of which at least one well is subjected to pressure means provided by a fluid and is at least partially permeable to said fluid, thereby exerting the action of a fluid in the direction of the said conveyor belt and essentially on the objects of the outer layers.

---

This invention relates to a method and service for conveying objects, and especially rod-shaped objects such as cigarettes, from a given level to another level.

In order to feed cigarette-packing machines in particular, it often proves necessary, for example, to elevate a mass of cigarettes from the delivery level of the forming machines to the level of admission into the hoppers of the packing machines.

With this object in mind, it is advantageous to collect the cigarettes delivered by the forming machines into a sufficiently large mass to compensate for variations in output of both forming and packing machines; and it is known to elevate cigarettes from this mass and between the two different levels referred-to above by means of conveyor belts which are either vertical or practically vertical.

The aim of this invention is to convey rod-shaped objects from one level to another in such a manner as to prevent any stresses or pressures which would prove detrimental to the quality of the objects being conveyed. Such stresses and pressures can arise from necked portions in the cross-section of the conveying passageway and from the thrusts which are exerted in order to overcome the inertia and weight of the objects to be elevated in said passageway.

The present invention relates to a method of conveying objects and especially rod-shaped objects such as cigarettes from one level to another level, and more especially from a given level to a higher level, characterized in that the objects are impelled by a moving preferably substantially vertical member having a smooth surface and against which at least some of said objects are applied by pressure means provided by a fluid which is directed towards said member.

In other words, one feature of the method consists in fixing those objects which are in direct contact with a conveyor by means of an airstream produced through the conveyor, for example, in such a manner that this first or outer layer of objects should form a surface having a sufficiently open structure to permit the retention of the following layer and so on in sequence in the case of objects which form successive layers. It will be apparent that the successive superposed layers can be formed both above and below the conveyor. In the case of objects placed below the conveyor, it will merely be necessary without thereby departing from the scope of the invention to support the objects of the last layer by means of any suitable support which can be, for example, either a flat surface or even an airstream.

However, it will also be apparent that said support can also be movable in order to assist the propulsion of the mass of superposed objects. Moreover, said support can also be subjected to the action of pressure means provided by a fluid which is caused to flow through said support.

Accordingly, a second feature of the invention consists in a method of conveying between two levels a mass of juxtaposed or substantialy juxtaposed objects which are impelled within a conveying passageway constituted mainly by two members which are adapted to move in the same direction and against which at least a part of the objects constituting said mass is applied under the action of air which is sucked through said moving member in opposite directions.

This invention also relates to a device whereby objects and especially rod-shaped objects such as cigarettes are conveyed between two levels, said device being of the type comprising two moving members constituting an elevator passageway through which a mass of juxtaposed or substantially juxtaposed obects is conveyed, characterized in that the moving members are two endless belts in which the carrying runs determine therebetween all or part of a passageway which is subjected within well-defined zones to aspirating mean for producing suction in opposite directions through the conveyor-belts.

The conveying passageway will preferably have a constant cross-sectional area.

The carrying runs which form the walls of the conveying passageway are advantageously supported and guided along their path of travel within the passageway by stationary or rotary permeable elements in the zones which are subjected to suction; the rotary elements each have a felly which is permeable to the fluid and are so arranged that only those portions which are located in contact with the belt can be subjected to the reduced pressure (partial vacuum).

The walls of the conveying passageway can be formed by the carrying runs of a plurality of consecutive belts in order to improve the regularity of conveyance according to the length and layout of the path to be followed. Said walls can also be formed by at least two parallel conveyor belts which fix the objects in position at several points of their length or only a number of said objects.

In a particular embodiment, the feed opening of the passageway can be formed by a portion of the carrying run of the upper belt which is placed in a plane parallel to a traveling-band conveyor which supplies the objects to be elevated; said band conveyor is placed at a distance which corresponds to the width of cross-section of the passageway.

By way of alternative, the lower end of the passageway can be endowed with a shape such that the opening is directed upwards, in which case the carrying run of the lower belt extends beyond the upper belt in the upstream direction and below the zone of delivery of objects to be conveyed, said objects being directed towards the opening by means of a guide member which can be a shell or a conveyor for example.

In order to ensure that the products to be conveyed are handled with care, provision is made for a feed conveyor which is adapted to communicate directly with the feed opening of the passageway, the speed of the feed conveyor being regulated as a function of the output of the machines which supply said conveyor in such a manner as to ensure that the thickness of the layer of superposed objects is at least equal to the height of cross-section of the passageway.

In the device according to the invention, provision is made for means which serve to detect the level of objects in the feed opening of the passageway and to produce a variation in the air pressure within at least one reduced-pressure (partial vacuum) chamber which communicates with the passageway through one of the conveyor belts. Inasmuch as the objects located at the sides are no longer applied against the moving belts or less securely attached thereto, the objects therefore come to a standstill or slow down inside the elevator passageway. The means referred-to can be provided in the top portion of the feed opening of the passageway and will be brought into operation, for example, when the perforations formed in the horizontal portion of the upper belt are not closed off as a result of insufficient height of the layer of objects to be conveyed.

Another aim of this invention consists in providing means for detecting either an excess quantity or an insufficient quantity of objects in proximity to the feed opening in order to produce a variation in the speed of the feed conveyor and elevator belts and optionally to increase or decrease the degree of vacuum.

The means under consideration can consist of a pivotal flap which is applied against the objects being conveyed, said flap being connected to a control system which is capable of modifying either the value of the partial vacuum or the speed of the elevator belts and of the feed conveyor.

The control system which is intended to modify the degree of vacuum can be employed for the purpose of producing action either on the reduced-pressure source or on adjustable openings formed in the chambers for the purpose of modifying the pressure which is exerted through the permeable belts.

In a preferred embodiment of the invention, the control system is made self-regulating. This self-regulating operation can be obtained by adjusting the rate of flow of the fluid which is intended to pass through the upper belt of the passageway in the zone of its feed opening so that the objects of a layer which is not sufficient in this region may be subjected to the action of gravity rather than the action of pressure of the fluid. Should this give rise to a relatively substantial flow of fluid through this portion of the belt, all those walls of the passageway which are dependent on the same chamber will be subjected to a partial vacuum which is correspondingly lower as the above-mentioned flow is higher. The objects which constitute the outer layer in particular will accordingly be drawn against the belts to a lesser extent.

The following description of the present invention relates to non-limitative examples of construction, reference being made to the accompanying drawings, in which:

FIG. 1a is an enlarged section of the area marked 1a in FIG. 1;

Figure 1:
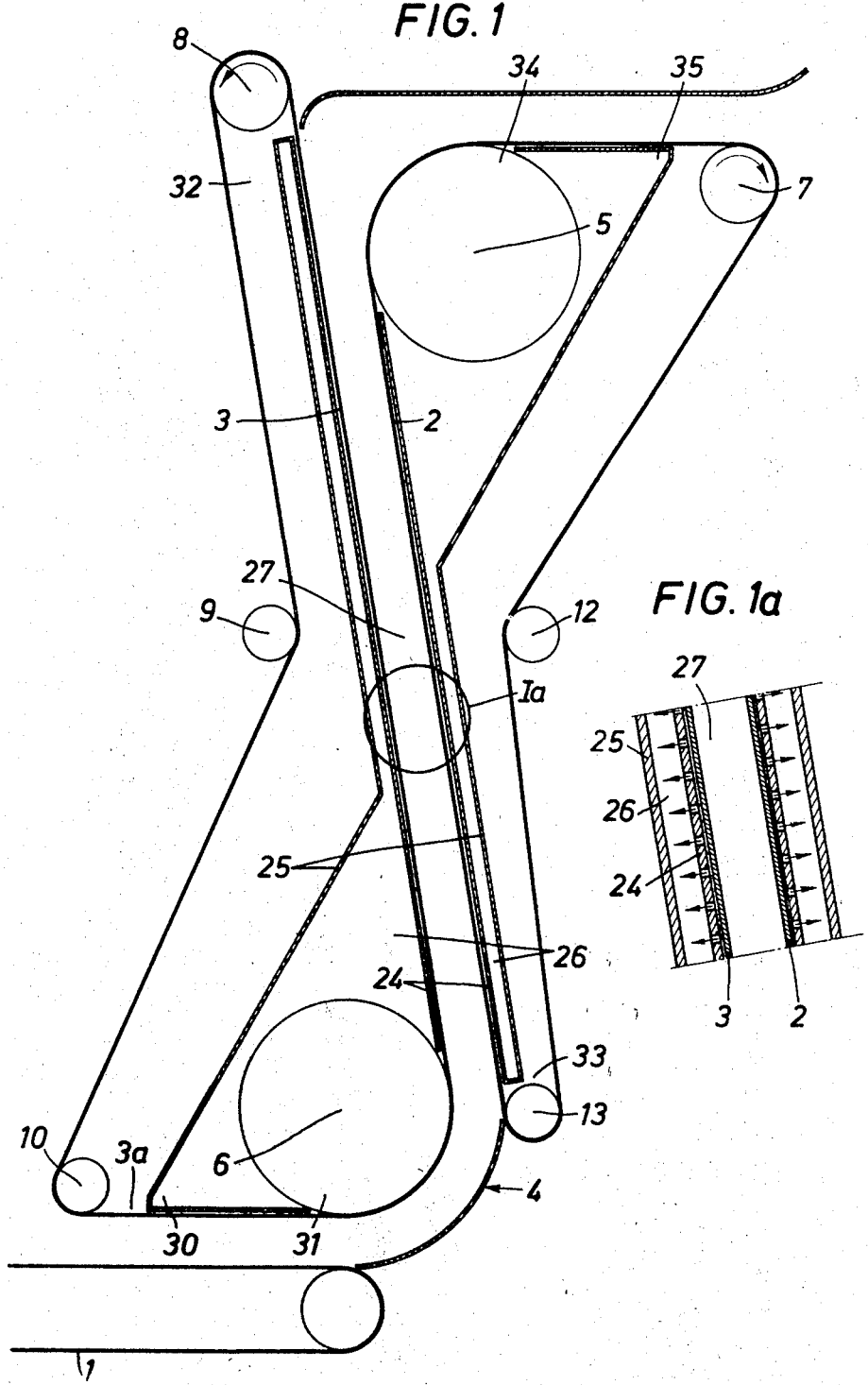
FIG. 1 is a diagram representing one form of construction of the device.

In FIG. 1, the reference numeral 1 corresponds to the feed conveyor band which constitutes the admission opening of the elevator passageway 27. Said conveyor band is placed in parallel relation with a horizontal run 3a of the permeable endless belt 3 and at a distance from this latter which is equal to the width of transverse cross-section of the passageway, namely to the thickness of the mass of objects to be conveyed. The belt 3 which is driven by the drum 8 in the direction shown by the arrow is guided by the rollers 9 and 10 and by the drum 6. Said belt is supported and guided by the stationary permeable members 24 and by the suction drum 6. The entire sector of the drum which is not in contact with the carrying run 3 is included in the corresponding vacuum enclosure 26.

Provision is made at 4 for a shell which serves as a junction plate between the conveyor 1 and the permeable belt 2. Said shell constitutes together with the corresponding zone of the drum 6 an annular segment equal in cross-sectional area to that of the conveying passageway.

The belt 2 is driven by the drum 7 in the direction of the arrow and guided by the rollers 12 and 13, by the stationary permeable members 24 and by the suction drum 5. The entire sector of the drum 5 which is not in contact with the carrying run of the belt 2 is also included in the corresponding vacuum enclosure 26.

A pump or suction device (not shown in the drawings) serves to produce a partial vacuum within the chambers 26 which are formed between the support members 24, the partition walls 25 and the side walls (not shown) and consequently within the drums 5 and 6.

The operation of the device hereinabove described is as follows:

The objects to be elevated to a higher level are supplied in suppressed layers by the conveyor 1, the speed of which is regulated as a function of the delivery of objects deposited by the machines which feed said conveyor and in such a manner as to maintain the objects in layers. As soon as they reach the feed opening of the passageway at the point designated by the reference 30, those objects which are located in the uppermost layer of the mass are aspirated and carried along by the carrying run of the belt 3; the lowermost objects continue to be carried along by the conveyor 1 and those located at the center follow since they are maintained by vault effect inside the recesses formed between said objects.

The mass of objects is thus brought by means of the shell 4 and the drum 6 up to point 33 of the belt 2. The objects located at each side are sucked against the belts 2 and 3 and carried upwards whilst the objects located at the center which are still substantially juxtaposed are applied against the lateral objects and also carried along as a result of a vault or bridge effect. At the upper end of the passageway, the suction stops at 32 and the objects which are released are carried along together with those which are still aspirated around the drum 3 up to the point 35 of the belt 2, that is to say up to the discharge end of the device.

Should the level of the mass of objects arriving at the inlet of the elevator passageway fall as a result of an unexpected change in the rate of feed, the perforations provided in the portion 3a of the belt 3 are no longer shut off between the points 30 and 31 or are shut off only to a partial extent; the absolute air pressure within the suction pipes increases and the elevator belts exert a less powerful attraction on the objects which are in contact therewith; this gives rise to incipient sliding of the mass of objects relative to the conveyor belts and the output of the elevator decreases, thus conforming to the input.

Depending on the nature of the device which is placed at the discharge end of the elevator, the suction zone located between points 34 and 35 can be either employed or dispensed with inasmuch as a zone which is subjected to a partial vacuum at the discharge end of the elevator should never be devoid of objects.

Figure 2:
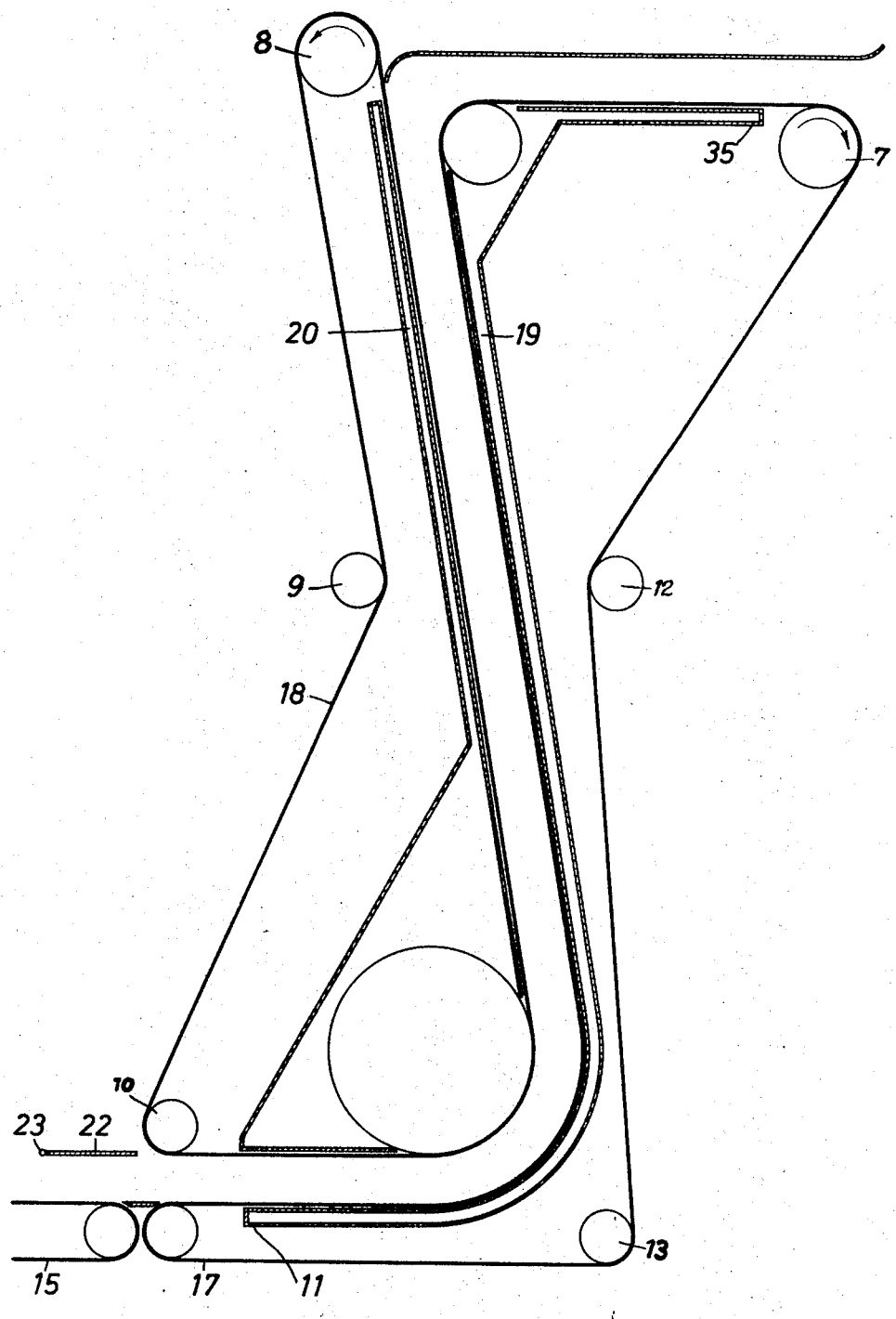
FIG. 2 is a diagram of a possible alternative form of construction of the device.

In the alternative form of construction which is presented in FIG. 2, the objects are supplied in superposed layers by the traveling band 15 which is located at the same level as the permeable belt 17 which is in turn placed beneath the permeable belt 18.

The two belts 17 and 18 are supported by the ducts 19 and 20 which are designed to be permeable so as to permit the flow of air which is sucked through said belts; these latter are guided, for example, by means of angle-iron members in which the edges of said belts are set.

In this variant, the reduced pressure (partial vacuum) maintains the objects transported in contact with the belt 17 between the points 11 and 35, that is to say practically over the entire length of the passageway.

A flap 22 which is pivotally mounted on the pin 23 serves to detect the variations in level at the admission end of the device and controls either a vacuum-regulating device or a device for varying the speed of the belts 17 and 18 in order to maintain a rate of discharge which corresponds to the rate of feed of objects.

Figure 3:
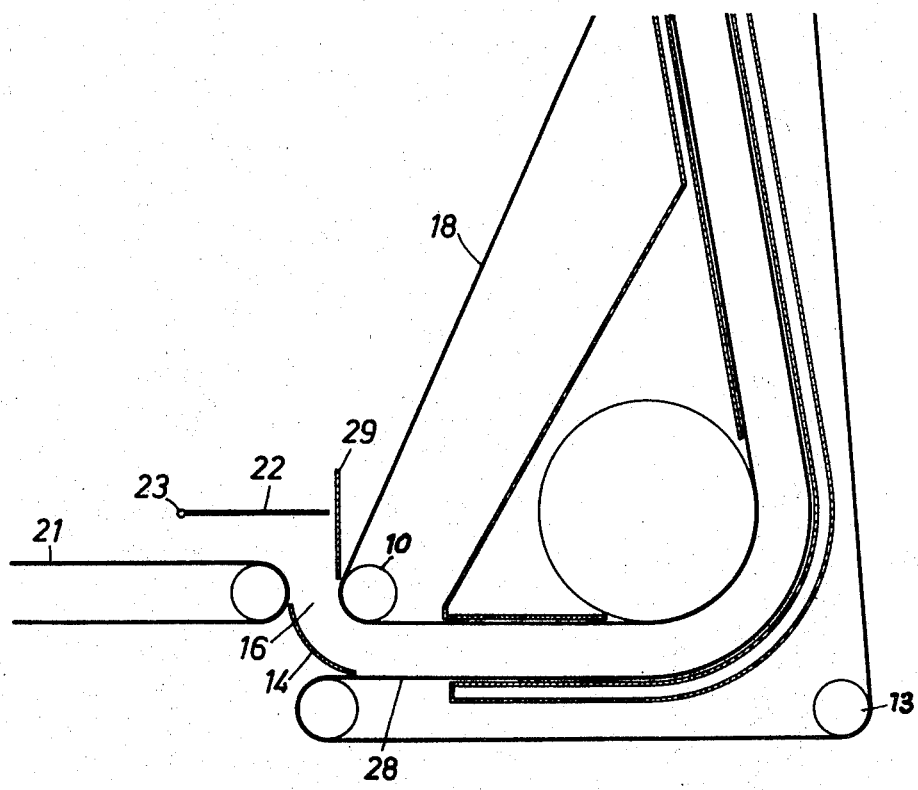
FIG. 3 is an alternative form of feed opening.

In accordance with the variant of FIG. 3, the feed opening of the passageway is designed in the form of a well 16, the admission opening of which is directed upwards. Said well 16 is delimited by the declined section of the belt 18 and the wall 29, the shell 14 and the feed band 21. The flap 22 which is pivoted about the pin 23 is located above the opening of the well.

In accordance with the variant under consideration, the vertical well will make it possible to limit the consequences of variations of very short duration in the supply. In this form of construction as in the others, it is possible to assign to the flap a role in which it serves to detect any excess supply, whilst insufficient supply can be detected by other means such as measurement of the reduced pressure.

It is advantageous to ensure that the angle of slope of the belts should be correspondingly greater as the passageway delimited by the belts is of greater width. By this means, it is also ensured that the passageway contains only a minimum number of objects whose line of application of weight does not come into contact with the belts themselves.

What I claim is:

1. A device whereby objects and especially rod-shaped objects such as cigarettes are conveyed between two levels, the said device being of the type comprising at least two endless conveyors such as belts between which a mass of the said objects is introduced, said belts forming therebetween at least part of a passageway of which at least one wall is subjected to pressure means provided by a fluid and is at least partially permeable to said fluid, a feed conveyor adapted to communicate directly with the feed opening of the passageway, and means for regulating the speed of said feed conveyor as a function of the maximum output of the machines which supply said conveyor in such a manner as to ensure that the thickness of the layer of superposed objects is at least equal to the height of cross-section of the passageway.

2. A device as in claim 1 wherein the conveyors are inclined with reference to the vertical so that the passageway delimited by said conveyors contains only a minimum number of objects whose line of application of weight does not encounter said conveyors themselves.

3. A device as in claim 1 wherein the belts form therebetween at least part of a passageway having a constant cross-sectional area.

4. A device as in claim 1 wherein the belts are supported at least in the path of travel which is located within the passageway by elements which are permeable to the fluid over at least a part of the said path of travel.

5. A device as in claim 4, wherein the portion of each element which is permeable to the fluid constitutes one of the walls of at least one suction chamber which is coupled to a vacuum source.

6. A device as in claim 4, wherein a number of permeable elements are rotatable.

7. A device as in claim 6, wherein at least one suction chamber is provided on each side of the passageway.

8. A device as in claim 1, wherein at least a part of the walls of the passageway is constituted by the carrying runs of a plurality of belts.

9. A device as in claim 1, including a feed conveyor adapted to communicate directly with the feed opening of the passageway, and means for regulating the speed of said feed conveyor as a function of the maximum output of the machines which supply said conveyor in such a manner as to ensure that the thickness of the layer of superposed objects is at least equal to the height of cross-section of the passageway.

10. A device as in claim 1, further comprising means to detect the level of objects in the feed opening of the passageway and to produce a variation in the pressure of the fluid within at least one of the suction chambers according to said level.

11. A device as in claim 10, wherein said detection means are provided in the top portion of the passageway in the feed opening zone thereof.

12. A device as in claim 11, wherein the rate of flow of fluid through the belt which constitutes the top wall of the passageway in the feed opening zone thereof is regulated so that said flow is not sufficient to draw towards the said belt those objects of the top layer which are practically not maintained in contact with the said belt by the layers located underneath.

13. A device as in claim 12, wherein the motion of the fluid through the part of the belt constituting the top wall of the passageway is obtained by means of a vacuum-producing unit proper and that the pressure variations within the corresponding suction chamber are utilized for producing a variation in fluid pressure within at least part of the other suction chambers.

14. A device as in claim 12, wherein the part of the passageway located in the feed opening zone thereof is connected to at least one of the suction chambers which communicate with the remainder of the passageway and are located on one side of said passageway.

15. A device as in claim 12, wherein the part of the passageway located in the feed opening zone thereof is connected to at least one of the suction chambers which communicate with the remainder of the said passageway and are located on both sides of said passageway.

16. A device as in claim 12, wherein the permeability of the top wall of the passageway located in the feed opening zone thereof with respect to the permeability of at least some of the other walls is regulated so that, when there are practically no objects in contact with at least part of the upper belt of the feed zone, the outermost objects come into contact to a reduced extent with the other walls of the passageway.

17. A device as in claim 10, wherein the detection means are provided upstream of the passageway above the feed conveyor and are constituted by a pivotal flap bearing on the objects being conveyed.

18. A device as in claim 1, further comprising means to detect the level of objects within the feed opening in order to produce a variation in the speed of the feed conveyor and elevator belts.

19. An arrangement for transferring cigarettes from a lower level to a higher level comprising, in combination, conveying belts extending parallel to each other between said lower level and said higher level at an inclined angle and forming a passage space between said belts for conveying said cigarettes through said space between said lower and higher level, said cigarettes being conveyed through said space in at least three superimposed parallel layers; and fluid means for exerting a force on at least one layer adjacent to both said belts and in the direction normal to the movement of said belt.

References Cited

UNITED STATES PATENTS

| | | | |
|---|---|---|---|
| 3,080,079 | 3/1963 | Lecrone | 214—1 |
| 3,185,284 | 5/1965 | Molins | 271—74 |
| 3,291,282 | 12/1966 | Pedagno | 214—1 |
| 3,266,690 | 8/1966 | Goettsch | 226—95 |

FOREIGN PATENTS

| | | |
|---|---|---|
| 687,587 | 2/1940 | Germany. |
| 644,746 | 1/1964 | Belgium. |

RICHARD E. AEGERTER, Primary Examiner

U.S. Cl. X.R.

198—184